United States Patent [19]
Roll

[11] 3,885,040
[45] May 20, 1975

[54] METHODS AND BENZAMIDE COMPOSITIONS FOR PRODUCING HYPOTENSIVE ACTIVITY

[75] Inventor: William D. Roll, Toledo, Ohio

[73] Assignee: The University of Toledo, Toledo, Ohio

[22] Filed: Apr. 25, 1974

[21] Appl. No.: 463,959

Related U.S. Application Data

[60] Division of Ser. No. 336,415, Feb. 28, 1973, Pat. No. 3,808,315, which is a continuation-in-part of Ser. No. 180,206, Sept. 13, 1971, abandoned, which is a division of Ser. No. 822,029, May 5, 1969, Pat. No. 3,660,461.

[52] U.S. Cl. ................................................ 424/304
[51] Int. Cl. ............................................ A61k 27/00
[58] Field of Search .................................... 424/304

[56] References Cited
UNITED STATES PATENTS

| | | | |
|---|---|---|---|
| 2,927,126 | 3/1960 | Pursglove | 260/465 D |
| 3,172,869 | 3/1965 | Saxon | 260/465 D |
| 3,457,294 | 7/1969 | Crovetti et al. | 260/465 D |

Primary Examiner—Albert T. Meyers
Assistant Examiner—Norman A. Drezin

[57] ABSTRACT

Hypotensive pharmaceutical compositions comprising effective amounts of compounds of the formula:

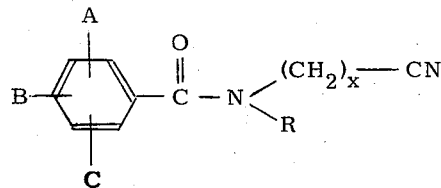

wherein A, B, and C are selected from the group consisting of hydrogen, lower alkyl, lower alkoxy, and halogen radicals at least one of which is an alkoxy or a halogen radical; wherein $x$ is a whole number from one to three, and wherein R is selected from the group consisting of cycloaliphatic radicals containing between three and seven carbon atoms, together with carriers therefor, and the methods for administering said compounds.

12 Claims, No Drawings

METHODS AND BENZAMIDE COMPOSITIONS FOR PRODUCING HYPOTENSIVE ACTIVITY

RELATED APPLICATION

This application is a division of William D. Roll copending application Ser. No. 336,415 filed Feb. 28, 1973 now U.S. Pat. No. 3,808,315, which is a continuation-in-part of William D. Roll copending application Ser. No. 180,206 filed Sept. 13, 1971 now abandoned, which is a division of his application Ser. No. 822,029 filed May 5, 1969, now U.S. Pat. No. 3,660,461 issued May 2, 1972.

BACKGROUND OF THE INVENTION

Although similar N-cyanoalkyl benzamides are known, no similar ones were found which had the hypotensive effects of applicant's compounds. For example; the Crobetti et al U.S. Pat. No. 3,457,294 patented July 22, 1969 is for antibacterial, antifungal and antiprotozal activity, the Pursglove U.S. Pat. No. 2,927,126 patented Mar. 1, 1960 is for a biocide, and the Saxon U.S. Pat. No. 3,172,869 patented Mar. 9, 1965 is for a plasticizer.

Although similar N-cycloalkyl benzamides are known, they only had biocide or CNS depressant effects, and none had hypotensive activity.

SUMMARY OF THE INVENTION

This invention comprises pharmaceutical compositions containing various benzamides having hypotensive activity and methods of administering these compositions to small animals to produce these effects.

The compositions of this invention are unit dosage forms, such as tablet, capsule, sterile solution, etc., containing a therapeutically effective amount of benzamide having the general formula:

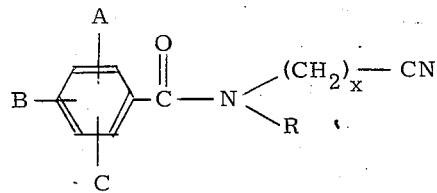

wherein A, B, and C may be mono-, di-, or tri-fluoro-, chloro-, bromo-, iodo-, methoxy-, or ethoxy- radicals and may be mono- or di-methyl, or ethyl- radicals, but preferably chloro- or methoxy- radicals substituted in the ortho-, meta-, and para-positions, but preferably in the meta- or para-positions, of the phenyl ring of the benzamide. The cyanoalkyl radical of the benzamide may comprise a cyano- methyl-, ethyl-, or propyl- radical, but preferably the cyanoethyl-radical while the R radical may comprise a tri-, quatra-, penta-, hexa-, or hepta- cycloaliphatic radical, preferably cyclohexyl radical, which together with the halo- or methoxy- radicals on the phenyl ring of the benzamide confers the proper physicochemical properties on these compounds which are necessary for maximal activity in the animals tested. Although the N-cyanoethyl-radical is preferred, the N-cyanopropyl-radical also is good, but the N-cyanomethyl is less effective, and these N-cyanoalkyl radicals of four or more carbon atoms produce no significant hypotensive action in any practical dosages.

These benzamides were prepared by the modification of the Schotten-Baumann Reaction according to the following equation:

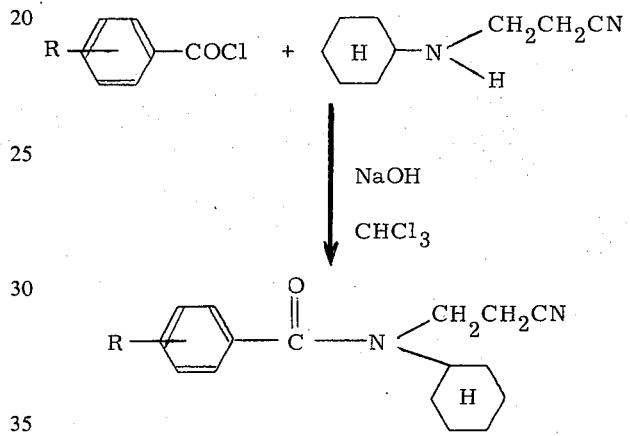

Herein an acyl halide was reacted with an N-(2-cyanoalkyl)- cycloalkylamine in the presence of sodium hydroxide and chloroform at room temperature and agitated until the exothermic reaction was complete. The chloroform layer was then washed with water, dried with anhydrous sodium sulfate and evaporated in vacuum to produce a viscous yellow oil which crystallized on standing for a period of several weeks. This crude product was then re-crystallized from aqueous ethanol to give the pure new compounds of this invention, which were tested for composition and physical properties. The results of some of these tests on the preferred N-cyclohexyl-N-cyanoethyl-methoxy- and chlorobenzamides are shown in the following Table I:

TABLE 1

| Example Numbers | Phenyl Ring Substituted Radical | % Yield by Above Process | Melting Points In °C | Ultra Violet Data | Infrared Absorption C=O | CN | Calculated % C | H | Analyzed % C | H |
| --- | --- | --- | --- | --- | --- | --- | --- | --- | --- | --- |
| 1 | p—CH₃O— | 76.8 | 77–78 | 282 | 1679 | 1630 | 2265 | 71.30 | 7.74 | 71.33 | 7.78 |
| 2 | m—CH₃O— | 75.0 | | 282 | 2040 | 1630 | 2265 | 71.30 | 7.74 | 71.77 | 7.83 |
| 3 | o—CH₃O— | 74.5 | 43–44 | 282 | 2611 | 1630 | 2265 | 71.30 | 7.74 | 71.45 | 7.80 |
| 4 | p—Cl— | 79.4 | 93–94 | 266 | 1500 | 1630 | 2265 | 66.08 | 6.58 | 66.20 | 6.50 |
| 5 | m—Cl— | 75.0 | 48–49 | 266 | 757 | 1630 | 2265 | 66.08 | 6.58 | 66.12 | 6.63 |
| 6 | o—Cl— | 78.4 | 56–57 | 266 | 391 | 1630 | 2265 | 66.08 | 6.58 | 66.14 | 6.60 |

The activity of these benzamide compounds was tested by dissolving them in propylene glycol and parenterally injecting the resulting solutions into small animals such as rats in dosages of 2 and of 4 milligrams per kilogram of weight of the animal injected. The direct blood pressure measurements for these new compounds were conducted in eight Wistar rats for each compound, which rats were under urethane anesthesia, 1.2 g/kg. i.p., with a mercury monometer connected to the carotid artery. The solutions of these new compounds were injected via the femoral vein. Indirect blood pressure measurements were conducted in normotensive Wistar rats using a photoelectric tensometer.

The results of these pharmacological tests for the new compounds listed in Table I above are shown in the following Table II:

TABLE II

At Dosage 4mg./kg. in rats

| Compound of Example No. | Relative Hypotensive Action |
|---|---|
| 1 | ++++++ |
| 2 | +++++ |
| 3 | ++ |
| 4 | ++++ |
| 5 | +++ |
| 6 | + |

The pharmaceutical compositions of this invention are composed of these benzamides incorporated in a non-toxic liquid or solid pharmaceutical carrier or excipient. Thus, simple propylene glycol solutions of the active ingredients have been found suitable, however, the active ingredients may be incorporated in pharmaceutical carrier forms, such as tables or capsules, which may contain other non-toxic materials such as fillers or diluents, namely: lactose or sucrose, and may contain a binding agent such as glucose, gum acacia, gelatin, starch paste, etc. Furthermore, they may contain lubricants, such as magnesium stearate, talc, etc., as well as such disintegrating agents as corn starch, microcrystalline cellulose, etc. The active ingredients may also be incorporated into injectable solutions which may contain other non-toxic materials including: solvents, such as propylene glycol, water for injection, etc., and preservatives, such as benzyl alcohol, etc.

The unit dosage forms are prepared by standard formulation methods such as by granulating and tableting, by mixing with a carrier and filling into hard gelatin capsules; by dissolving or suspending in a suitable sterile parenteral vehicle; or by dissolving in an aqueous vehicle for an oral liquid dosage form.

The unit dosage forms will contain a sufficient amount of active ingredient to provide effective hypotensive activity with corresponding minimal toxic side effects.

A unit dose range of from approximately 10–150 mg. provides hypotensive activity with minimal side reactions. Such unit doses are administered 1–4 times daily. For calculating the amounts of active ingredients in the claimed unit dosage forms, it is often convenient to use milligrams of the active compounds per kilogram of the weight of the animal to which they are administered, depending on the activity of the active ingredient together with the size and pharmacology of the host animal. In such claimed unit dosages, the active compound will be present in approximately 0.5 – 10 mg./kg. but preferably 1 – 5 mg./kg. amounts.

The following examples are designed to explain the methods of preparation and administration of the compounds of this invention, but it is to be understood that they are not to limit the scope of this invention:

EXAMPLE I

N-cyclohexyl-N-cyanoethyl-p-methoxybenzamide was prepared by shaking a mixture of 15 of chloroform, 0.01 mole of N-(-2-cyanoethyl) cyclohexylamine, 60 milliliters of 5% sodium hydroxide, and 0.01 mole of p-methoxy-acyl chloride in a separator at room temperature until the exothermic action was complete. The chloroform layer was washed with water, dried with anhydrous sodium sulfate, and evaporated in a vacuum to produce a viscous yellow oil which crystallized on standing for a period of several weeks. These crude crystals were then re-crystallized from aqueous ethanol to form the pure N-cyclohexyl-N-cyanoethyl-p-methoxy-benzamide sample of this Example.

This sample was then tested according to the Table I above in which the carbon and hydrogen content or percentages were obtained with a Coleman carbon-hydrogen analyzer. The melting point was determined by using a Mettler FP-1 melting and boiling point apparatus. The infrared absorption spectra were obtained with Perkin-Elmer Model 137-B spectrophotometer, and the ultraviolet data were obtained with a Bausch and Lomb Spectronic 600 Spectrophotometer.

This new compound produced a significant hypotensive effect when administered orally or intraperitoneally to unanesthetized normotensive rats.

The oral administration of four milligrams per kilogram of this Example 1 compound dissolved in propylene glycol resulted in a significant reduction in blood pressure of rats.

EXAMPLE 2

N-cyclohexyl-N-cyanoethyl-m-methoxybenzamide was prepared from m-methoxy acyl chloride and N-2-(2-cyanoethyl) cyclohexylamine in the same manner as that employed in Example I above, except that it was purified by chromatography on silica gel and eluted with petroleum ether. The resulting compound was also tested as described in Example I above, and as shown in Tables I and II above, and in a dose of 4 mg./kg. produces a significant reduction in blood pressure.

EXAMPLE 3

N-cyclohexyl-N-cyanoethyl-o-methoxybenzamide also was produced in the manner described in Example I above and similarly tested as described therein and as shown in the above Tables I and II, and was shown to have blood pressure depressor activity in dosages of 4 mg./kg.

EXAMPLE 4

N-cyclohexyl-N-cyanoethyl-p-chlorobenzamide was also produced according to the process described in Example 1 above and similarly tested as shown in Tables I and II.

EXAMPLE 5

N-cyclohexyl-N-cyanoethyl-m-chlorobenzamide was also produced similar to the process described in Example 1, and it had pharmacological effects similar to those for the compound of Example 2 as shown in Table II.

EXAMPLE 6

N-cyclohexyl-N-cyanoethyl-o-chlorobenzamide was produced according to the process described for Example 1 and was tested to have properties and an activity slightly less than the compound of Example 3.

EXAMPLE 7

Tablet Formulation

|  | Gm./Tablet |
|---|---|
| Active Ingredient | 0.025 |
| Lactose | 0.150 |
| Sucrose | 0.025 |
| Corn Starch | 0.015 |
| Stearic Acid | 0.003 |

These ingredients are granulated and compressed by standard pharmaceutical methods.

EXAMPLE 8

|  | Gm./Capsule |
|---|---|
| Capsule Formulation |  |
| Active Ingredient | 0.025 |
| Magnesium Stearate | 0.002 |
| Lactrose, qs ad | 0.300 |

These ingredients are screened, mixed and filled into hard gelatine capsules.

EXAMPLE 9

Parenteral Formulation

| Active Ingredient | 0.040 | o/o |
|---|---|---|
| Propylene glycol | 60.00 | o/o |
| Benzyl alcohol | 2.00 | o/o |
| Water for injection, USP, qs ad. | 100.00 | o/o |

While there is described above the principles of this invention in connection with specific products, it is to be clearly understood that this description is made only by way of example and not as a limitation to the scope of this invention.

I claim:

1. A method of producing hypotensive activity in an animal needing such treatment comprising administering internally to said host animal a nontoxic but effective quantity of a compound of the formula:

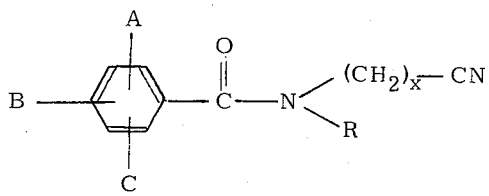

wherein A, B and C are selected from the group consisting of hydrogen, lower alkyl, lower alkoxy, and halogen, at least one of which is alkoxy or halogen, wherein $x$ is a whole number from one to three, and wherein R is cyclo-alkyl containing between three and seven carbon atoms.

2. A method according to claim 1 wherein A is hydrogen and B and C are located in the meta-, and para- positions.

3. A method according to claim 1 wherein $x$ is 2.

4. A method according to claim 1 wherein R is cyclohexyl.

5. A method according to claim 1 wherein A is halogen and B and C are hydrogen.

6. A method according to claim 1 wherein A is methoxy and B and C are hydrogen.

7. A method according to claim 1 wherein said compound is N-cyclohexyl-N-cyanoethyl-p-methoxybenzamide.

8. A method according to claim 1 wherein said compound is N-cyclohexyl-N-cyanoethyl-m-methoxybenzamide.

9. A method according to claim 1 wherein said compound is N-cyclohexyl-N-cyanoethyl-p-chlorobenzamide.

10. A method according to claim 1 wherein the quality of said compound administered is between about 0.5 and 10 milligrams per kilogram of the host animal.

11. A method according to claim 1 wherein the quantity of said compound administered is between about 1 and 5 milligram per kilogram of the host animal.

12. A method according to claim 1 wherein said compound together with a pharmaceutically acceptable carrier is administered in a unit dose composition in the form of a capsule, tablet, or parenteral formulation.

* * * * *

UNITED STATES PATENT OFFICE
CERTIFICATE OF CORRECTION

PATENT NO. : 3,885,040
DATED : May 20, 1975
INVENTOR(S) : William D. ROLL

It is certified that error appears in the above-identified patent and that said Letters Patent are hereby corrected as shown below:

Col. 2,     line 11,     change "these" to -- those -- line 43,     after "in" insert -- a -- line 56,     Table I, 4th column after "In" insert -- $\overset{o}{C}$ --

5th column cancel " $\overset{o}{C}$ "

Col. 3,     line 33,     change "tables" to -- tablets --

Col. 4,     line 6,      after "15" insert -- milliliters -- line 25,     after "with" insert -- a --

Col. 5,     line 27,     change "Lactrose" to -- Lactose --

Col. 6,     lines 37 & 38,     change "quality" to -- quantity --

Signed and Sealed this twenty-third Day of September 1975

[SEAL]

Attest:

RUTH C. MASON
Attesting Officer

C. MARSHALL DANN
Commissioner of Patents and Trademarks